Dec. 8, 1931.   R. HOTTEL   1,835,049
VEHICLE BODY
Filed Dec. 12, 1927

INVENTOR
RAY HOTTEL.
BY
*Irving Harness*
ATTORNEY

Patented Dec. 8, 1931

1,835,049

UNITED STATES PATENT OFFICE

RAY HOTTEL, OF DETROIT, MICHIGAN, ASSIGNOR TO CHRYSLER CORPORATION, OF DETROIT, MICHIGAN, A CORPORATION OF DELAWARE

VEHICLE BODY

Application filed December 12, 1927. Serial No. 239,281.

This invention relates to a vehicle seat construction and more particularly to an arm rest therefor.

An automobile seat is usually made having a width to accommodate three passengers. When one or two passengers are in the seat, it is desirable to provide an arm rest in the center of the seat but such has been found objectionable in that three passengers cannot be seated.

It is therefore an important object of this invention to provide a swinging arm rest which may be used when less than three passengers are seated and which may be swung out of the way for accommodating a third passenger or when its use is not desired.

Another object of the invention is to pivot the arm rest from the seat back and to form it in such a manner that when it is in closed position it appears as one of the plaits of the seat back upholstery; there being no indication of a swinging member adapted for an arm rest.

When the arm rest in in its closed position it forms a part of the seat back. An opening in the seat back is made when the arm rest is swung to a position for use. This opening is unsightly. It is therefore another object of this invention to provide a closure for the opening. As an example of this closure I have provided a member which is automatically brought into position by the movement of the arm rest to its usable position.

Other objects and advantages will more fully appear from the following description taken in connection with the accompanying drawings in which.

Figures 1, 2, 3, 4, 5:
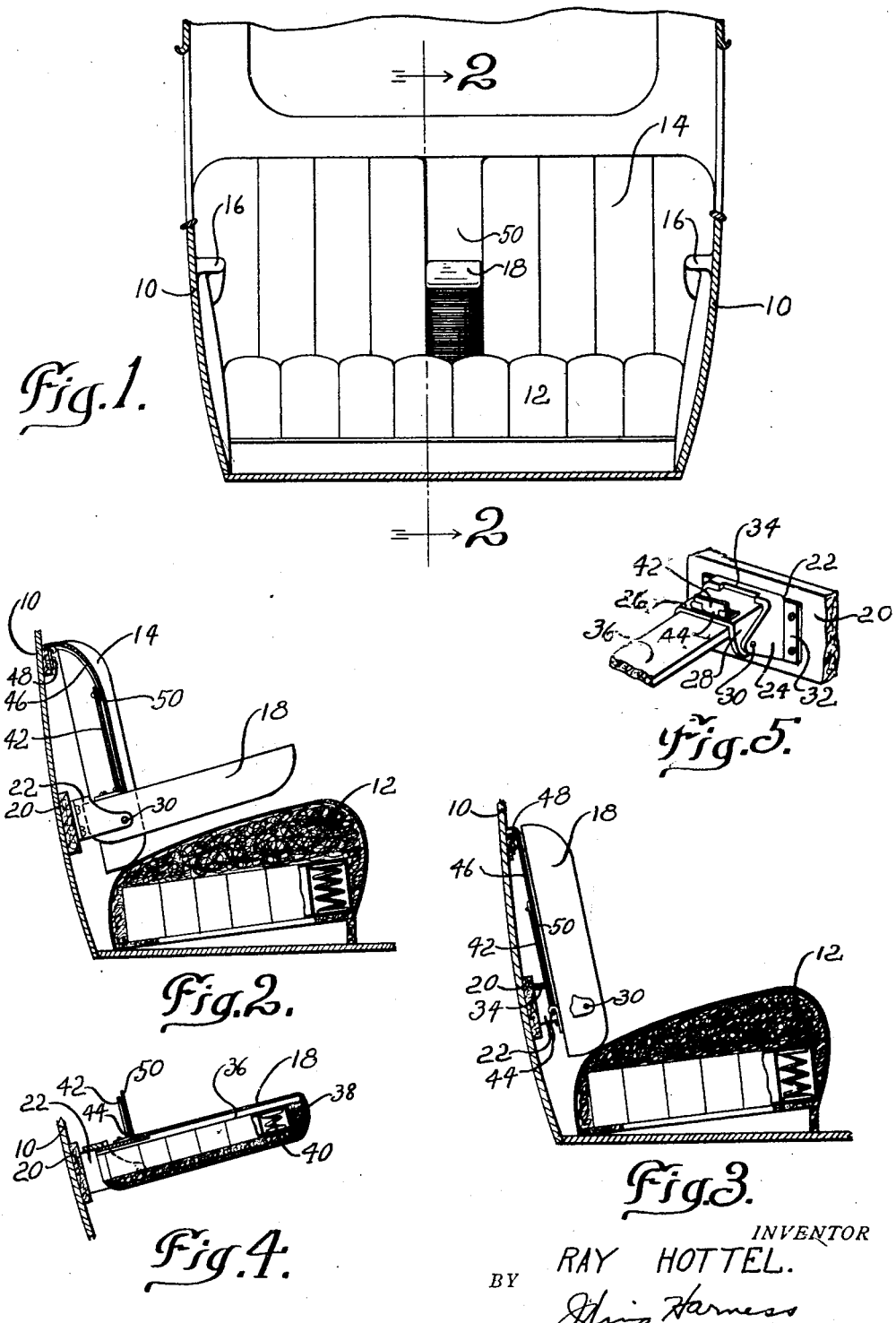
Fig. 1 is a sectional view through an automobile body showing the rear seat in elevational and the arm rest in position for use.
Fig. 2 is a sectional view through the rear seat taken on line 2—2 of Fig. 1.
Fig. 3 is a sectional view corresponding to Fig. 2 showing the arm rest in inoperative position but forming a part of the seat back.
Fig. 4 is a sectional view through the arm rest.
Fig. 5 is a perspective view of the hinge for the arm rest.

Referring to the drawings, wherein I have illustrated my invention as applied to the rear seat of an automobile, the reference numeral 10 designates an automobile body having a seat cushion 12 and a seat back 14, both of which are formed in plaits of padded upholstery, usual in seat construction. Conventional arm rests 16 have been shown on the side walls of the body 10.

A centrally located arm rest 18 is adapted to be swung from the seat back 14 and is shown pivoted on a suitable bracket secured to a frame member 20 of the body 10. The bracket comprises a two part hinge. One part 22 has a pair of outwardly projecting flanges 24, spaced to receive the other part 26 which is provided with lateral flanges 28 pivoted as at 30 to the flanges 24. The part 22 is provided with flanges 32, adapted to be secured to the frame member 20, and an upper portion 34, adapted to engage the upper plate of the part 26 to form a stop for the extreme positions of the arm rest 18.

The part 26 is a part of the arm rest structure and is secured to a member 36, upon which is mounted the usual padding 38 and springs 40, conforming to the shape of the seat back 14. The arm rest is made the width of one plait to appear as a part of the seat back when it is not in use. As a closure for the space between the back cushions, when the central arm rest is in use, I provide a rigid strip 42, hinged as at 44 to the arm rest and in a vertical line with the pivot 30 when the arm rest is in position for use. The upper end of the rigid strip 42 is provided with a flexible member 46 which is hinged as at 48 to the upper portion of the seat back 14. A covering 50, corresponding to the upholstery of the seat, is provided on the outer surface of the two strips.

It will be understood that when the arm rest is in closed position the strips 42 and 46 lie between the seat back and the arm rest; the lower pivot 44 being on a horizontal line with pivot 30. As the arm rest is swung downwardly the pivot 44 follows the path of an arc around the pivot 30 shortening the distance between the two pivot points 44 and 48 which causes the flexible member to buckle, thereby presenting a contour which corresponds with the contour of the seat back. Thus the opening is closed by the movement of the arm rest. If desired the pivot 30 may be extended forwardly to make the outer surfaces of the closure and seat back flush.

While I have described what I deem to be the preferred form of my invention, various changes including size and arrangement of parts, may be made without departing from the spirit of my invention and it is not my intention to limit its scope other than by the terms of the appended claims.

What I claim is:

1. A device of the class described comprising a seat back, spaced paddings forming the outer surface of said seat back, a padded arm rest in the space between said spaced paddings, means pivotally mounting said arm rest upon said seat back whereby the arm rest may be moved outwardly and downwardly to arm supporting position, and means operated by said arm rest closing the space left thereby when said arm rest is moved to arm supporting position, said closing means conforming to the contour of the outer surface of said seat back when the padded member is in its latter position.

2. A device of the class described comprising, a spaced two part seat back, an arm rest pivoted with respect to said seat back adapted to close the space between the two parts, said arm rest having a contour corresponding to that of the seat back, a rigid member pivoted to said arm rest, a flexible member connecting one end of said rigid member and the rear upper edge of said seat back, said rigid member being positioned on said arm rest to move upwardly and outwardly when said arm rest is swung downwardly.

3. In a vehicle body, a seat back including a pair of spaced, upholstered paddings forming the outer surface of said seat back, an arm rest in the space between said paddings, means pivotally mounting said arm rest upon said seat back, said arm rest being movable outwardly and downwardly to an arm supporting position, a flexible covering corresponding to the upholstery of said paddings located in said space, and means operable by said arm rest for urging said covering outwardly to the contour of said paddings so as to close the space left by said arm rest when the latter is moved to an arm supporting position.

4. In a vehicle body, a seat back including a pair of spaced, upholstered paddings forming the outer surface of said seat back, an arm rest in the space between said paddings, means pivotally mounting said arm rest upon said seat back, said arm rest being movable outwardly and downwardly to an arm supporting position, a flexible covering corresponding to the upholstery of said paddings located in said space secured at one end to said seat back and at its other end to said arm rest, a rigid member pivoted to said arm rest, and a flexible member connecting the free end of said rigid member and the upper edge of said back rest, said members being located in said space in back of said covering and adapted to urge the latter outwardly to the contour of said paddings when said arm rest is in an arm supporting position.

RAY HOTTEL.